C. BYRNE.
SPRING WHEEL.
APPLICATION FILED MAY 11, 1915.
1,150,995.
Patented Aug. 24, 1915.
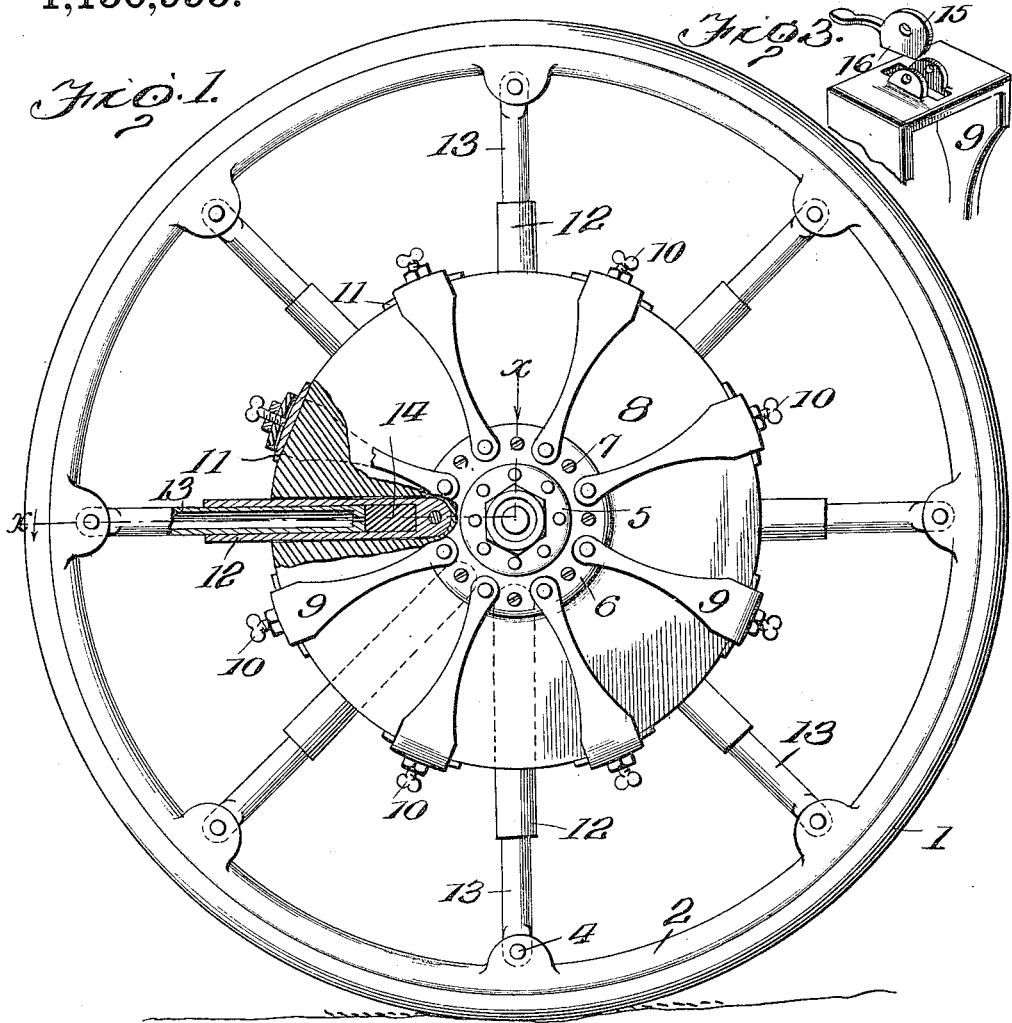
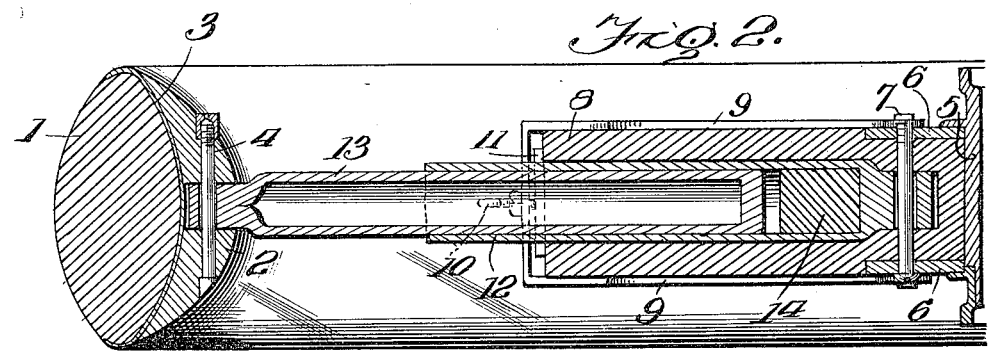
Inventor
Clare Byrne.

UNITED STATES PATENT OFFICE.

CLARE BYRNE, OF WAGNER, SOUTH DAKOTA.

SPRING-WHEEL.

1,150,995. Specification of Letters Patent. Patented Aug. 24, 1915.

Application filed May 11, 1915. Serial No. 27,407.

*To all whom it may concern:*

Be it known that I, CLARE BYRNE, a citizen of the United States, residing at Wagner, in the county of Charles Mix and State of South Dakota, have invented certain new and useful Improvements in Spring-Wheels, of which the following is a specification.

This invention relates to vehicle wheels of the type embodying a yieldable rim so as to compensate for shock and vibration.

The invention is primarily designed to overcome the objections urged against pneumatic tires, while at the same time attaining all, or nearly all, the advantages resulting from the use of pneumatic tires.

The invention provides a spring wheel which may be adjusted to the load and which admits of replacements being readily made and the parts being easily assembled or separated as occasion may require.

With these and other objects in view, which will readily appear as the nature of the invention is better understood, the same consists in the improved construction and novel arrangement and combination of parts which will be hereinafter fully described and particularly claimed.

In the accompanying drawings has been illustrated a simple and preferred form of the invention, it being, however, understood that no limitation is necessarily made to the precise structural details therein exhibited, but that changes, alterations and modifications within the scope of the invention as claimed may be resorted to when desired.

Referring to the drawings,—Figure 1 is a side view of a spring wheel embodying the invention, a portion being broken away to show more clearly the relation of the parts; Fig. 2 is an enlarged section of one-half of the wheel on the line $x$—$x$ of Fig. 1; Fig. 3 is a perspective view of a modification.

Corresponding and like parts are referred to in the following description and indicated in all the views of the drawing by the same reference characters.

The wheel embodies inner and outer portions and adjustable spokes, the latter comprising telescoping sections, which are pivotally connected to the respective parts of the wheel. The outer portion of the wheel comprises a tire 1, a felly 2 and a felly band 3. The tire 1 is preferably of hard rubber although it may be formed of any suitable material. In cross section the tire is preferably elliptical and is arranged with its major axis at a right angle to the plane of the wheel so as to present a broad tread and a broad inner face to engage the felly band 3. It is preferred to construct the felly in similar parts which are connected by means of bolts or fastenings 4. These fastenings also serve to pivotally connect the outer ends of the spokes to the rim.

The inner part of the wheel comprises a hub 5 and flanges 6. Bolts, or fastenings 7, connect the flanges 6 and also serve to pivotally connect the inner ends of the spokes to the hub. A center piece 8 preferably of rubber is slipped upon the hub 5 and confined between the flanges 6 and is formed with radial openings in which the spokes are fitted. The center piece 8 being yieldable admits of the outer, or rim portion, of the wheel having an eccentric movement so as to compensate for shock and vibration. Stirrups 9 embrace opposite sides and the outer edge of the center piece 8 and are secured at their inner ends to the flanges 6. The stirrups 9 are disposed mid-way between the spokes and each is provided at its outer end with adjusting means for compressing the center piece 8 more or less so as to regulate the resistance offered to the yielding of the rim. Adjusting screws 10 are threaded into the outer ends of the stirrups and follow plates 11 are interposed between the inner ends of the adjusting screws and the outer edge of the yieldable center piece so as to receive the end thrust of the adjusting screws and distribute the pressure upon the edge of the center piece in such a manner as to insure compression thereof. By compressing the center piece 8 to a greater or less extent by means of the adjusting screws the yielding of the wheel may be regulated to suit the load.

The spokes comprise inner sections 12 and outer sections 13. These spoke sections have a telescoping arrangement to admit of lengthening and shortening of the spokes to allow for the eccentric movement of the outer or rim portion of the wheel. The outer spoke sections 13 slide within the inner spoke sections 12 and cushioning means 14 is disposed between the inner ends of the sections of each of the spokes so as to normally press the spoke sections 13 outward. The cushioning means 14 may be of any nature so as to exert an outward yielding pressure upon the spoke sections 13.

In the modification shown in Fig. 3 a cam 15 is illustrated as the means for compressing the center piece 8 and is mounted upon the outer end of a stirrup 9. This cam has a flat edge 16 to engage the follow plate and hold the cam in position when turned to compress the part 8.

It will be understood from the foregoing, taken in connection with the accompanying drawing that the invention provides a spring wheel embodying spokes, which are adapted to have both a pivotal and a sliding movement whereby ample provision is had for the eccentric movement of the outer or rim portion of the wheel. Moreover, the resistance to the pivotal movement of the spokes and to the yielding of the rim portion of the wheel may be adjusted to the load with the result that the riding qualities of a vehicle equipped with wheels embodying the invention are such as to increase the comfort of the occupants.

Having thus described the invention, what is claimed as new is:—

1. In a spring wheel, the combination of inner and outer parts, spokes connecting such parts, yieldable load sustaining means between the spokes, supporting means extending across the yieldable load sustaining means, and adjusting devices mounted in the supporting means for compressing the yieldable load sustaining means to a greater or less extent according to the load to be carried.

2. A spring wheel comprising inner and outer parts, extensible spokes having pivotal connection at their ends with the respective parts, a yieldable center piece receiving the inner spoke sections, stirrups embracing the yieldable center piece and attached at their inner ends to the hub portion of the wheel, and adjusting means applied to the outer ends of the stirrups for compressing the yieldable center piece more or less.

In testimony whereof I affix my signature in presence of two witnesses.

CLARE BYRNE. [L. S.]

Witnesses:
JEREMIAH M. PYLE,
JOHN WILLIAM MORRISON.

Copies of this patent may be obtained for five cents each, by addressing the "Commissioner of Patents, Washington, D. C."